United States Patent Office

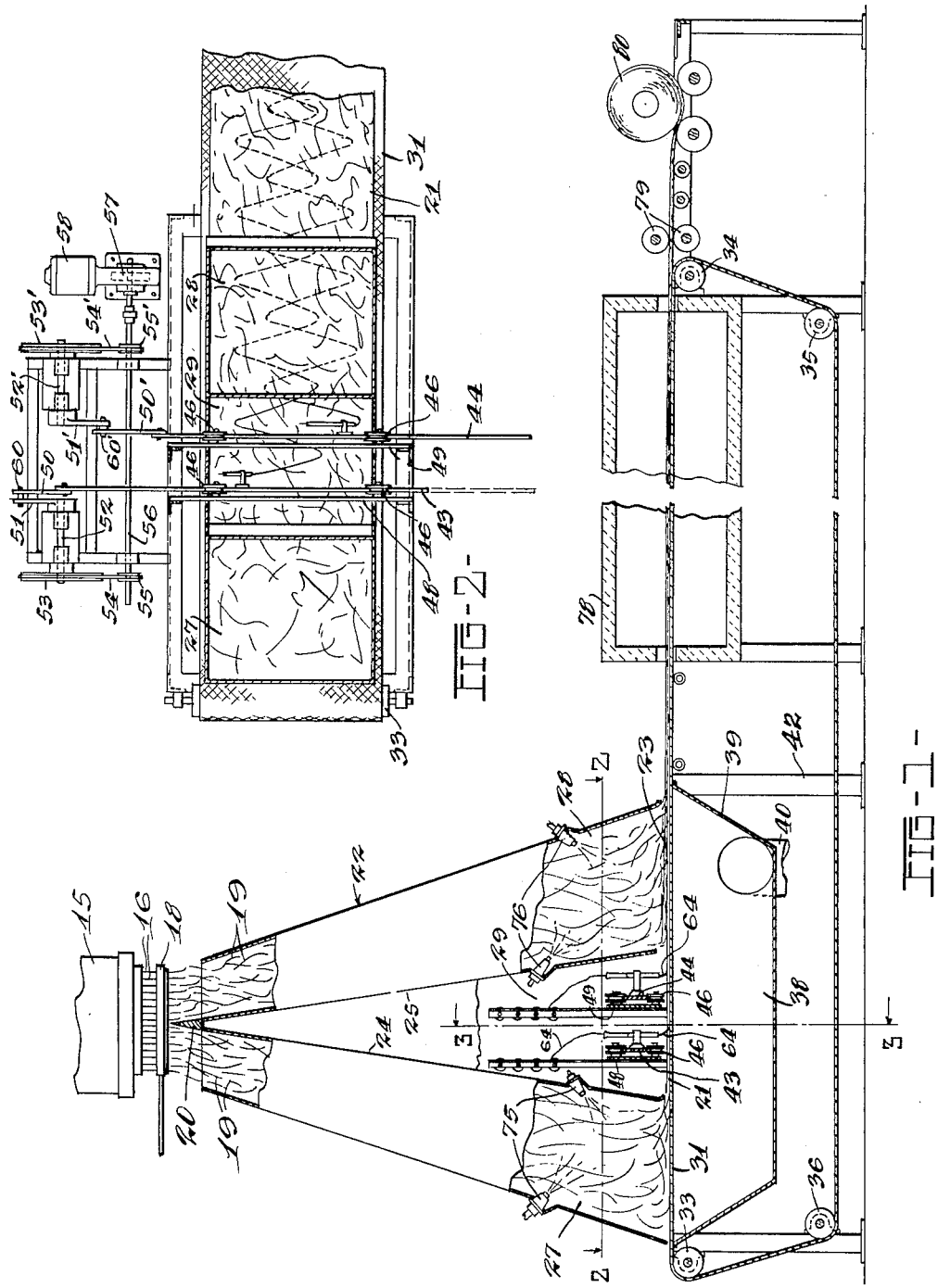
Jan. 31, 1956  W. G. VAN DER HOVEN  2,732,885
METHOD AND APPARATUS FOR PRODUCING
REINFORCED FIBROUS PRODUCTS
Filed Nov. 19, 1949  3 Sheets-Sheet 1
Inventor:
WALTER G. VAN DER HOVEN.
By
Attorneys.

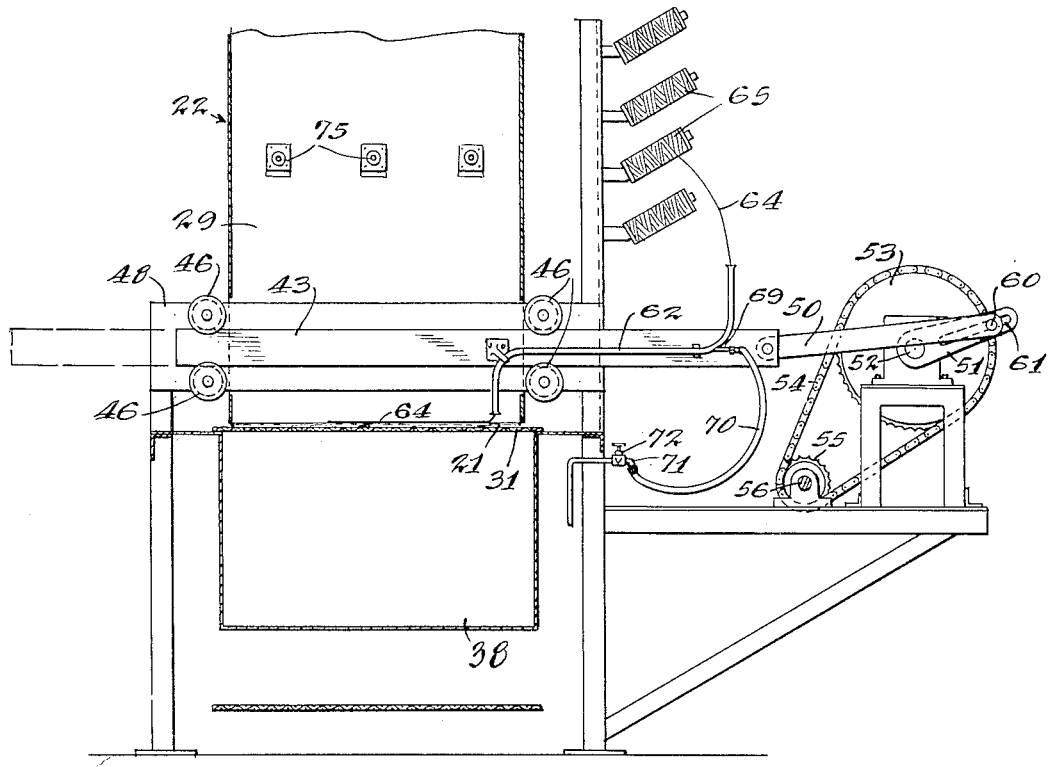
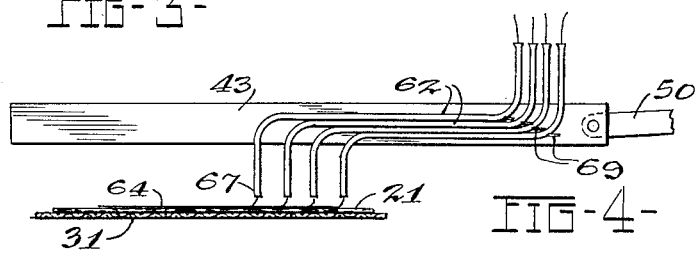
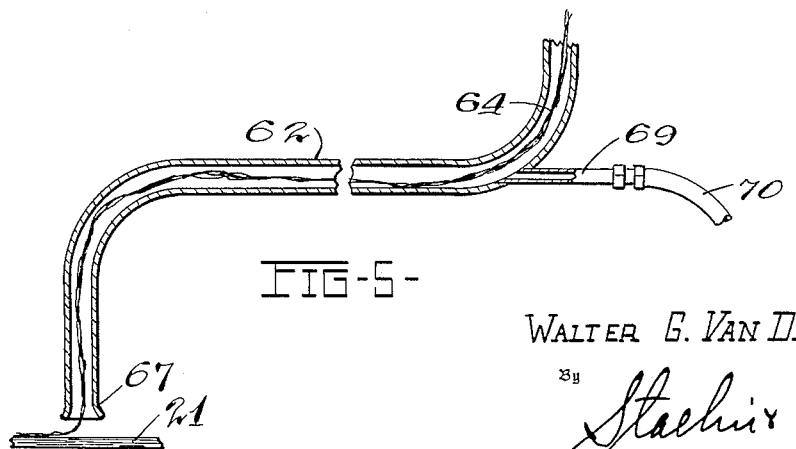

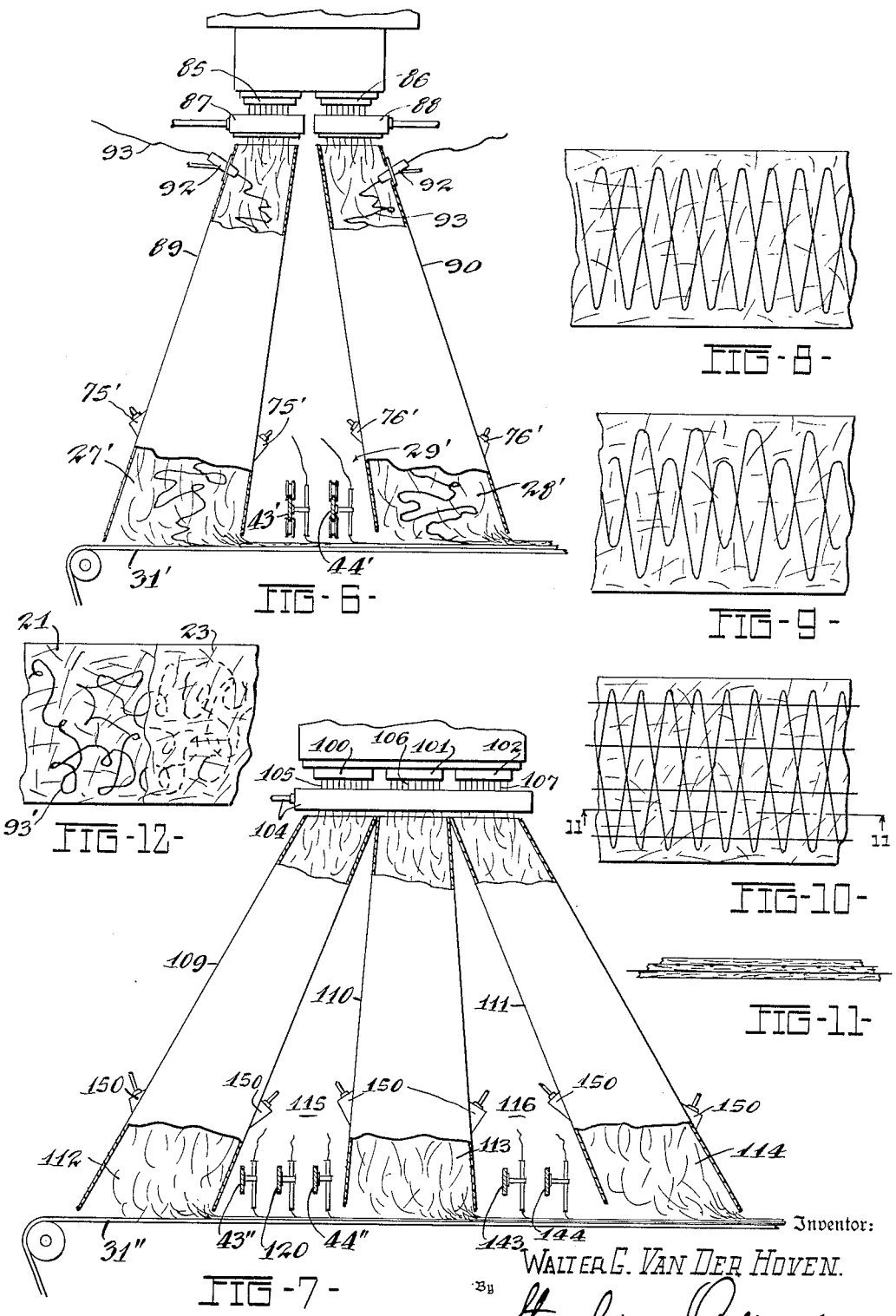

2,732,885
Patented Jan. 31, 1956

2,732,885

METHOD AND APPARATUS FOR PRODUCING REINFORCED FIBROUS PRODUCTS

Walter G. Van Der Hoven, Newark, Ohio, assignor to Owens-Corning Fiberglas Corporation, a corporation of Delaware Application November 19, 1949, Serial No. 128,456

5 Claims. (Cl. 154—27)

This invention relates to fibrous products formed from individual fibers and stranded materials and to a method and apparatus for producing mats, sheets or bats of fibrous material reinforced with strands or yarns forming integrated assemblies for use in various industrial applications and as adjuncts useful in manufacturing and fabricating other products.

It has been conventional practice in the manufacture of fibrous mats or sheets to collect a mass of individual fibers of varying lengths into a mat, sheet or bat formation, the fibers being assembled in haphazard or random fashion and bonded together by an adhesive or bonding agent so as to impart mass integrity to the product. Mats or bats of various types and sizes have been formed from linear fiber forming material processed and attenuated to fibers of varying lengths which are collected in random formation, the end products finding ready application and use for various industrial insulation purposes, electric and dielectric insulation, for sound attenuating and heat insulation, refrigeration and for reinforcements in fabricating molded products.

Several fiber forming substances have been utilized to produce fibers or filaments by drawing or attenuating the materials in molten or plastic condition and glass has been found to be particularly adaptable for fiber and filament forming and attenuating processes. Fibers or filaments formed from glass may be attenuated into very fine fibers by several methods. One method which is in conventional use involves flowing molten glass from a feeder or bushing having a comparatively large number of openings to accommodate the formation of an equal number of glass streams and concomitantly directing a high velocity jet of gas, as for example air or steam under pressure onto and in the direction of flow of the glass streams so as to draw or attenuate the glass streams into fine fibers which solidify while entrained in the gas stream. During the fiber forming and attenuating operations, the fibers are disrupted into varying lengths and are collected in a fluffy mass upon a suitable surface or conveyor. The individual fibers or filaments produced by this method are collected in haphazard fashion in a mass and follow no definite pattern. The collected fibers may be treated with an adhesive material or bonding agent so as to impart stability to the mass of fibers.

While fibrous mats or bats produced by this method were found capable of application in certain uses and installations, such products lacked tensile strength by reason of the fabrication thereof of individual fibers of varying lengths. In order to effect dimensional stability and greater strength of the fibrous formed products it has been proposed to integrate with the fibers at the time of their accumulation a continuous strand or strands of materials acting as a reinforcing media for the fibrous mass and thereby improve the strength and tear resistant characteristics of the formed product. A method embodying this procedure included the simultaneous deposition of a continuous strand or strands of material with the fibers during the collecting operation whereby the continuous strand or strands are haphazardly dispersed in the mass of fibers. While this method produced an improved product it has been found not to be entirely satisfactory for many uses. In some cases the continuous strands have been disposed on the surface of the mass resulting in a fuzzy or unsightly appearance, and have become dislodged, thus impairing the strength of the product.

One of the objects of the present invention is the provision of a method of assemblage or integration of continuous strands or linear bundles of fibers with a mass of individual fibers wherein the resultant product is endowed with improved strength characteristics and dimensional stability over prior products.

Another object of the invention embraces an improved method of associating strands of fibers with haphazardly related individual fibers concomitantly with the collection of the fibers into a mat, whereby the strands are disposed within the interior of the fibrous product and substantially wholly contained between the major faces of the mat.

Another object is the provision of intimate mixtures or agglomerates of continuous strands or yarns and haphazardly related individual fibers resulting in a product in which the strands are oriented in a manner to obtain high tensile strength characteristics with a minimum of weight of fibrous materials.

Another object of the invention resides in the provision of an improved method of integrating continuous filaments or strands with a mass of haphazardly assembled fibers whereby the continuous filaments or strands are embedded in the fibrous mass in a manner whereby a definite pattern or uniform distribution of the continuous filaments or strands throughout the fibrous mass is attained.

Another object of the invention resides in a method of assembling continuous filaments, strands or yarns in a mass of fibrous material in a manner whereby the lateral and longitudinal strength characteristics of the assembled product may be controlled.

Another object of the invention is an improved method of assembling continuous strands or yarns in a mass of haphazardly arranged fibers whereby a layer or lamina of continuous strands or yarns is disposed between layers or groups of fibrous material whereby the continuous strands or yarns are embedded in the assemblage in a manner whereby tendency for the strands or yarns to delaminate is eliminated.

Another object of the invention resides in a method of forming fibers from linear fiber forming material in a manner whereby the fibers during formation are attenuated and groups thereof directed to different zones of accumulation whereby an assemblage of laminae formed of the groups of fibers may be attained.

Another object of the invention resides in a method of subdividing a mass of fibers formed from glass or other fiber forming material into two or more groups or formations assembled in a manner to form a laminated product and of disposing linear reinforcing media between adjacent laminae so formed whereby the strength factors of the resultant assemblage may be controlled so that the strength factor of the resultant assemblage in a longitudinal direction may be of a different value than the strength factor in a transverse direction.

Another object of the invention resides in the fabrication of a mat or bat formed of glass fibers haphazardly assembled with continuous strands or yarns of reinforcing material in a manner whereby the distribution of the strands or yarns in the mass of fibers may be controlled and the fibers and strands bonded into a unit endowed with a high degree of mass integrity and of substantially uniform thickness and density.

Another object of the invention embraces the method or process of manufacturing a mat, sheet or bat comprising alternate layers of haphazardly assembled glass fibers and continuous strands or yarns and in which a bonding agent or adhesive is applied to the resultant assemblage so as to compact the fibers and strand structure into an integrated mass which will have substantially permanent dimensional stability as compared with sheets, mats or bats fabricated by prior methods.

A further object of the invention resides in an apparatus for continuously and concomitantly assembling layers of haphazardly related fibers with one or more layers of linear bundles of fibers or strands as a reinforcing medium and impregnating the resultant assemblage in a manner whereby a high rate of production of finished product may be attained.

A further object of the invention resides in an apparatus for effectively subdividing a mass of fibers during formation and attenuation thereof and directing the subdivided constituents to spaced zones of accumulation and collection whereby layers of fibrous material may be individually formed for subsequent assembly into an integrated mat or sheet.

Another object of the invention is the provision of a laminated product fabricated of haphazardly related fibers and continuous strands or yarns, the assemblage being such that the longitudinal and transverse strength values in the finished product may be varied, controlled or modified so as to produce a product especially adaptable to particular uses and installations.

Still another object of the invention embraces the provision of a simple and commercially practicable process of forming and attenuating glass fibers and simultaneously collecting the fibers into groups or layers and assembling the layers with continuous glass strands or yarns in a manner whereby a finished product is continuously formed and the resultant assemblage of layers impregnated with a suitable adhesive or bonding agent to impart permanence and stability to the resultant laminated structure.

Still a further object of the invention is the provision of a fabricated fibrous product incorporating continuous reinforcing strands or yarns correlated in the resultant product in such a manner that there is no tendency for the continuous strands or yarns to be disrupted or displaced in use.

Still another object of the invention resides in the provision of apparatus for forming and attenuating glass fibers and collecting the fibers in spaced zones and includes means for correlating continuous linear reinforcing media with the fibers between the fiber collecting zones.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational semischematic view partly in section illustrating a form of apparatus for producing fibrous products in accordance with the principles of the present invention;

Figure 2 is a horizontal sectional view taken substantially on the line 2—2 of Figure 1;

Figure 3 is a vertical sectional view taken substantially on the line 3—3 of Figure 1;

Figure 4 is a detail view illustrating a form of strand or yarn distributing and applying means;

Figure 5 is an enlarged sectional view of a single strand distributing and applying tube;

Figure 6 is an elevational view partly in section illustrating a modified form of apparatus for producing fibrous products of the present invention;

Figure 7 is an elevational view partly in section showing another form of apparatus for carrying out the method of the invention;

Figure 8 is a plan view illustrating a section of mat or product formed by the method of my invention and showing one typical pattern of reinforcing strand or yarn distribution through the product;

Figure 9 is a plan view of a fibrous mat section showing a different pattern of reinforcing strands;

Figure 10 is a plan view of another form of mat illustrating the continuous strands extending in both transverse and parallel directions of the mat;

Figure 11 is a longitudinal sectional view taken substantially on the line 11—11 of Figure 10, and Figure 12 is a plan view partly in section illustrating a further form of strand distribution in a fibrous product.

While I have illustrated an apparatus especially adapted to form reinforced fibrous products of haphazardly arranged glass fibers and continuous strands or linear bundles of fibers oriented therewith, it is to be understood that I contemplate the utilization of the apparatus and the method of the invention for use in fabricating, processing and assembling fibers and strands formed of other materials.

Referring to the drawings and first with respect to the apparatus illustrated in Figures 1 through 5 inclusive, there is provided a feeder 15 which contains a supply of molten glass which is heated to molten condition by electricity or other suitable means. The feeder 15 is provided with a plurality of outlets or openings from which an equal number of streams of molten glass 16 issue continuously. The streams of molten glass are acted upon by blasts of gas issuing from jets or nozzles of a blower 18, the gaseous blasts being discharged in the general direction of normal flow of the molten glass streams 16, the relatively high velocity of the blasts engaging the glass streams serving to attenuate or draw the glass into relatively fine fibers 19 which pass downwardly and are collected in a manner hereinafter explained.

Disposed immediately below the blower 18 and centrally thereof is a shield or divider member 20 preferably of wedge shaped configuration which serves to divide or separate the moving fibers 19 into two groups. The groups of fibers pass downwardly through an enclosure or forming hood 22. Centrally disposed in the hood 22 is a pair of diverging walls 24 and 25, the upper ends of which cooperate with the divider 20 to maintain the two groups of fibers in different zones. The walls 24 and 25 separate the enclosure 22 into chambers 27, 28 and 29, the two groups of fibers being respectively conveyed downwardly through the chambers 27 and 28. The individual fibers produced in the manner above described are of varying lengths and are intermingled indiscriminately, the fibers doubling back and forth on themselves and are collected in a haphazard mass near the base of the hood or the enclosure 22, the collected mass forming a lower or bottom layer of fibers 21.

An endless conveyor 31 or other suitable surface is provided for collecting and assembling the fibers and continuous strands. The conveyor 31 is preferably of the foraminous or perforated type and is supported and guided in its movement by means of rollers 33, 34, 35 and 36. In the embodiment illustrated the conveyor 34 is moved so that the upper level or surface travels in a righthand direction as viewed in Figure 1 beneath the enclosure or forming hood 22 and is adapted to receive the collected fibers and strands. The deposition of the fibers is facilitated through the impression of a subatmospheric pressure or suction in a chamber 38 formed by a member 39 disposed beneath the upper section of the conveyor. A tube 40 connects the chamber 38 with a suitable suction producing means or blower (not shown). The group of fibers moving through the chamber 27 will be deposited directly upon the conveyor or collecting zone in advance of the deposition of the group of fibers moving through the chamber 28.

The blown or attenuated fibers 19 are of comparatively small diameters being usually from .00025 to .0008 of an inch, although fibers of other sizes may be utilized in forming the products of the present invention. The strands employed as reinforcing media in the fabrication of the products may be composed of many filaments or fibers of relatively fine character in the form of linear bundles of fibers providing a continuous strand or yarn which is endowed with a comparatively high tensile strength in the direction of its length. When the reinforcing strands are made up of glass filaments or fibers, the individual filaments or fibers usually range in diameter from .0002 to .00035 of an inch. The average strand made from glass that has been found satisfactory as a reinforcing medium is composed of approximately one hundred individual filaments or fibers. Two or more of such strands may be twisted together into a plied yarn where exceptional tensile strength is required.

The method of fabrication of fibrous products following the principles of the present invention include the application and distribution of reinforcing media in the form of continuous linear bundles of fibers, strands or yarns for the purpose of imparting stability and strength to the assemblage or end product. The method of the present invention makes possible the application and distribution of linear bundles of fibers or strands in a fibrous product in a great variety of patterns, the selected patterns being dependent upon the particular direction and orientation of strength factors desired in the finished product. For example the strands may be oriented principally in directions transversely of the mat or product or in a direction parallel of the mat. If desired combination patterns of parallel strands and transversely disposed strands may be attained. Further the method may be employed to embed continuous strands indiscriminately or haphazardly arranged in layer formation between layers or laminae of haphazardly collected individual fibers independently or in combination with a definite pattern or controlled orientation of other continuous strands. Thus the pattern or orientation of the continuous strands and the number of strands employed may be varied at will through the utilization of my method in a manner to fabricate an end product endowed with improved strength characteristics designed especially for a particular installation or use.

One means or apparatus for applying and distributing continuous strands or yarns is disposed in the chamber 29 intermediate the chambers 27 and 28. As particularly shown in Figures 2 and 3, the strand guiding and applying means is inclusive of a pair of members or bars 43 and 44 extending crosswise or transversely of the conveyor 31 and projecting through openings in the side walls of the chamber 29. The members 43 and 44 are mounted for reciprocatory movement and are preferably supported and guided by a plurality of grooved rollers 46. The rollers may be mounted upon suitable frames 48 and 49 which are carried upon the main frame 42.

The members 43 and 44 may be actuated or reciprocated by any suitable means. As illustrated in Figure 2 the bar 43 is connected by means of a link 50 with a crank arm 51 carried by a shaft 52 to which is connected a sprocket 53 driven by means of a chain 54 from a sprocket 55 mounted on a shaft 56. The shaft 56 is connected by means of suitable gearing enclosed in a casing 57 to an electrically energized motor 58 or other source of power. The member 44 is connected by means of a link 50' to a crank arm 51' carried by a shaft 52', a sprocket 53' mounted thereon being connected by a chain 54' to a sprocket 55' also fixedly mounted upon the shaft 56. The link 50 is connected by means of a pivot member 60 to the crank arm 51, the pivot 60 being supported by means carried in a slot 61 whereby the stroke or distance traveled by bar 43 may be varied by changing the position of the pivot pin 60 along the crank arm 51. The link 50' is likewise connected by means of a pivot pin 60' to the crank arm 51' and is adjustable in a similar manner to change the effective stroke or length of travel of the bar 44. One or both of the links 50 and 50' may be disconnected from pins 60 and 60' so as to provide for a relatively stationary position of one or both of the bars 43 and 44 whereby continuous strands may be deposited in directions parallel of the mat if desired.

The strand applicators or bars 43 and 44 are arranged to guide or direct the movement and deposition of continuous strands or yarns onto the lowermost layer of fibers 21 deposited on the conveyor 31 from the chamber or zone 27. Each of the bars 43 and 44 is provided with strand carrying means in the form of one or more small diameter tubes 62, the tubes being clamped or otherwise secured to the bars so as to be moved therewith during reciprocation or actuation of the bars. Each of the strand conveying tubes 62 is adapted to receive a linear bundle of fibers, strand or yarn 64 from a bobbin or strand supply 65. The strands as shown in Figures 3 and 4 pass through the guide tubes 62 and are discharged from the outlet ends 67 of the tubes which terminate above the layer of fibers 21 on the conveyor 31.

Means are provided for moving or feeding the continuous strands 64 to the applying zone 29. In the present embodiment the velocity of an air stream may be utilized to entrain and convey the strands 64 through the tubes 62. To this end, each tube 62 is provided with an opening into which extends a small tube 69 usually referred to as a lance tube which is connected by means of a flexible hose 70 to an air line 71 which is in communication with a supply of air under pressure. The amount of air admitted to each lance tube may be regulated by means of a valve 72. The angularity of the lance tube 69 with respect to the strand conveying tube 62 is such that the air stream ejected from the lance tube entrains the strand and carries it forward through the tube to be discharged upon the layer of haphazardly arranged fibers accumulated upon the conveyor belt 31. The rate of travel of the strands 64 may be regulated by varying the amount of air ejected from the lance tubes 69. Other types of conveying means for feeding the strands or yarn 64 may be employed if desired.

The discharge outlets 67 of the tubes 62 may be arranged in various positions and spaced in a manner to obtain varying orientations or patterns of the deposited strands. If the movement of the strand applying bar 43 is 180° out of phase with that of the bar 44, one or more continuous strands discharged from the strand outlets 67 will result in a continuous strand pattern or orientation of the character illustrated in Figure 8. If several strand outlets are spaced longitudinally along each of the bars 43 and 44 there will be an overlapping of the layers of continuous strands at the central zone or portion of the mat. If the stroke of each of the bars 43 and 44 is such that a strand outlet does not traverse the full width of the fibrous mat being formed, then a pattern or orientation of continuous strands will be produced similar to that illustrated in Figure 9. It will be apparent that the method and apparatus of my invention are readily adaptable for attaining the application of many different patterns of continuous strands. Thus by varying the relative speed of traverse of the reciprocating bars 43 and 44 with respect to the rate of longitudinal travel of the fibrous mat being formed, the number and spacing of transversely arranged loops of continuous strand in a given length of mat may be modified as desired. The process and apparatus of my invention may be utilized to deposit continuous strands or yarns both longitudinally and transversely of the formed mat. To attain this result one of the bars carrying the strand outlet or discharging tubes may be disconnected from the driving means so as to remain stationary and this may be accomplished by disconnecting the drive link therefor from its crank pin. The stationary bar may then be disposed in a position transversely of the mat so that as the mat travels longitudinally on the conveyor belt 31, the strand or strands 64 will be discharged onto the fibrous mat in parallel relationship. Simultaneously with the deposition of strands in parallel relation, the other bar may be reciprocated in the manner hereinbefore described to deposit a continuous strand or strands transversely of the mat so that the final product is reinforced by means of continuous strands in both longitudinal and transverse directions.

It is to be understood that the conveyor belt 31 is continuously moving and as viewed in Figure 1 conveys the material deposited thereon in a righthand direction. As the fibers passing through the chamber 27 are deposited upon the conveyor to form the layer 21, they are moved in a righthand direction beneath the continuous strand applying zone at the chamber 29, the layer of fibers 21 and continuous strands 64 deposited thereon continuously move in a righthand direction into the zone beneath the chamber 28. As they move beneath this chamber, a second layer 23 formed of fibers 19, which were separated from the first group of fibers by the divider or shield 20 and directed into the chamber 28, are deposited upon the lower layer 21 of fibers of the mat and directly upon the layer of continuous strands or yarns 64 applied at the zone 29. Thus the assemblage produced by the apparatus illustrated in Figure 1 is of a laminated character consisting of a lower layer 21 of haphazardly arranged individual fibers, an upper layer 23 of haphazardly arranged individual fibers with an intermediate layer or layers of continuous strands or yarns 64, the latter being completely enclosed or embedded between the two layers of individual fibers.

It is preferable to apply an adhesive or bonding agent to the layers of individual fibers which serves two purposes, viz. to compact the mass of fibers into sheet-like or more dense formation as well as to hold the assembled fibers and embedded strands in fixed relationship in the final product. As illustrated in Figure 1 nozzles 75 and 76 are arranged or disposed in the walls of chambers 27 and 28. These nozzles are connected to a supply of adhesive or bonding agent in liquid form (not shown) which is ejected or sprayed from the nozzles onto the fibers collecting in the respective zones at the bases of chambers 27 and 28. Any suitable adhesive or bonding agent may be employed as for example starch, sugar, glutinous materials, asphaltum compounds, methyl methacrylate or other resins, such as phenol-formaldehyde and urea-formaldehyde, or combinations or compounds of such materials. The application of an adhesive or bonding agent to the fibers collected in the chamber 27 serves to wet these fibers to a more compact layer formation 21 to receive the continuous strands or linear bundles of fibers which are applied in the form of a layer or layers upon the compacted group of individual fibers. Moreover the layer of fibers 21 is of substantially uniform thickness throughout its width as a result of the wetting or impregnation by the adhesive or bonding agent. At the time the fibers in chamber 28 are deposited upon the lower mat or layer 21 of fibers and continuous strands 64, the bonding agent or adhesive is ejected from the nozzle 76 to impregnate or wet the upper group or layer 23 of fibers, the bonding agent passing through the interstices in the upper fibrous mass so as to not only bond the individual fibers thereof into a unitary assembly but also serves to bond or fixedly embed the continuous strands in oriented position between the groups or layers of individual fibers.

The suction effective on the chamber 38 serves to facilitate the collection and compacting of the fibers into layers. The conveyor belt 31 provides a continuously moving collecting surface and support for the fibers and strands during assemblage. Disposed adjacent the fiber forming and collecting apparatus is an oven 78 which may be heated by electric means or in any other suitable manner to a temperature sufficient to cure or set the adhesive or bonding agent in the fibrous product. The cured product passes from the oven 78 through guide or feed rollers 79 to an accumulator roll 80.

An additional impregnation or immersion step may be utilized between the fiber forming and collecting apparatus and the oven 78 whereby the assembled product may be passed through a solution of bonding material if a higher degree of bonding or adhesion is desired in the finished product.

Figure 6 illustrates a modified form of apparatus in carrying out the method of my invention. In this form there is provided two glass feeders or bushings 85 and 86 and individual blowers 87 and 88 therefor. Each group of fibers produced by a feeder is directed downwardly into an individual forming hood, 89 designating the forming hood for the fibers emanating from the feeder 85, and 90 indicating the forming hood for the fibers emanating from the feeder 86. The forming hoods 89 and 90 are arranged to provide collecting chambers 27' and 28' in which the groups of fibers are individually collected in the manner shown in the Figure 1 form of apparatus. Disposed between the adjacent inner walls of the forming hoods 89 and 90 is a strand or yarn depositing zone 29' in which is disposed strand applying bars or means 43' and 44' which orient linear bundles of fibers in the form of strands or yarns into layer formation on the compacted layer of individual haphazardly related fibers collected upon the conveyor belt 31' in the zone or chamber 27'. In this form of apparatus the separate groups of individual fibers which are indiscriminately or haphazardly related in the collecting zones are produced by individual feeders and forming hoods in lieu of a single feeder and a divider or partition means for establishing the separate groups of fibers. Nozzles 75' and 76' are positioned in the forming hoods 89 and 90 for applying an adhesive or bonding agent to the collected fibers and strands in a manner described in connection with the apparatus illustrated in Figure 1 of the drawings.

The apparatus of Figure 6 also incorporates means for concomitantly assembling a continuous linear bundle of fibers in the form of strand or yarn haphazardly arranged in one or both of the collected layers of individual fibers if an end product of this character is desired. As illustrated there is disposed at the upper portion of each forming hood a strand discharging means in the form of a lance tube 92 by means of which a strand 93 is conveyed from a strand supply bobbin or other source (not shown) for discharge into a forming hood by suitable means. A jet of air under pressure is introduced into the lance tube or feeding device at such an angle as to entrain and carry the strand 93 into the forming hood. If desired, the introduction of a haphazard continuous strand may be included in one or the other or both groups of fibers depending upon the strength reinforcement or orientation desired in the final product. It is to be understood that the adjunct or means for distributing the strand or strands 93 for indiscriminate distribution in the groups or layers of individual fibers may be used with all forms of apparatus disclosed or may be dispensed with where this type of strand distribution or orientation is not desirable or necessary in the final product. Thus in certain types of end product, a haphazardly arranged strand 93 may be incorporated in the lowermost layer or group of individual fibers in combination with a controlled or definite pattern orientation of continuous strands deposited on the layer of fibers in the zone 29' and the use of the continuous strand 93 in the upper group or layer of individual fibers eliminated. A reversal of this assembly may likewise be obtained with a controlled orientation of a continuous strand or strand layers deposited on the lower layer of individual fibers and a strand 93 intermingled and indiscriminately arranged in the upper layer or group of individual fibers.

In lieu of the deposition of continuous strands in a manner to control the direction or orientation of the strands in the zone 29' on the lower layer of individual haphazardly arranged fibers, for certain types of fibrous end product a continuous strand or strands may be haphazardly laid upon the lower layer of individual fibers collected in the zone 27'. To accomplish this end, one or more lance tubes or strand conveying and discharging means may be directed into the zone or chamber 29' to deposit one or more continuous strands or linear bundles of fibers onto the lower layer of individual fibers but in a haphazard or uncontrolled formation. By this method of application a haphazardly arranged reinforcing medium or strand may be completely embedded between two layers or groups of individual fibers thus substantially reinforcing the tensile strength or tear resistance of the resulting product and wherein the reinforcing medium is retained in an embedded condition in the fibers so that during application or use of the product the reinforcing medium will not be disrupted or reach the outer surface of the groups of individual fibers.

Figure 12 illustrates a product in which a continuous haphazardly arranged strand 93' is embedded between layers 21 and 23 of groups of individual fibers. It is to be understood that a bonding agent may be introduced in the zone of application of the continuous strand if it is desired to augment the bonding agent introduced into the fiber collecting zones 27' and 28'.

It is to be understood that the method of my invention is not limited to the fabrication and assemblage of two layers or groups of individual fibers with an inner layer or layers of continuous strand material as the process of my invention is susceptible of producing products embodying several layers of individual fiber groups and layers of continuous strand material. Figure 7 illustrates an apparatus for carrying out the process of my invention in the fabrication of an end product incorporating three layers of fibers, each being a mass of indiscriminately arranged individual fibers, and layers of continuous strand material disposed between adjacent fibrous layers. Referring specifically to Figure 7 there is illustrated three glass feeding devices or bushings 100, 101 and 102 which operate in conjunction with a blower 104, the feeders arranged to form streams of molten glass 105, 106 and 107. Disposed beneath the feeders are forming hoods designated respectively 109, 110 and 111 for maintaining the groups of fibers formed from the glass streams in three separate groups, the fibers being attenuated as they move downwardly through the forming hoods under the influence of a stream of compressed air or steam under pressure. The lower portions of the forming hoods provide fiber collecting zones or chambers 112, 113 and 114. A conveyor belt 31" moves in a righthand direction beneath the terminae of the forming hoods to assemble the groups of indiscriminately arranged fibers and continuous strands into a unitary package or mat.

Disposed at the respective sides of the forming hood 110 are strand depositing zones 115 and 116 in which one or more continuous strands or bundles of linear material may be deposited so as to be disposed between adjacent layers or groups of indiscriminately or haphazardly arranged fibers. The strand depositing means may be fashioned to insert longitudinally extending strands in the mat being formed concomitantly with the deposition of a transverse over-layer of continuous strand, or alternate layers of longitudinal and transverse strands may be deposited concomitantly with the collection and assembly of the groups of individual indiscriminately arranged fibers. Thus in Figure 7 the bar 43" and bar 44" may be arranged with one or more strand outlet tubes of the character illustrated in Figure 5 and are arranged to reciprocate transversely of the mat so as to deposit two layers of transversely directed strands in the zone 115. A third bar 120 may be incorporated in the strand distributing zone 115 provided with strand outlets so as to deposit a third layer of continuous strands in zone 115. If the bar 120 is stationary, the movement of the mat being formed concomitantly with the deposition of strands from the outlets carried by the bar 120 will result in a third layer of parallel strands arranged lengthwise of the mat similar to the formation illustrated in plan view in Figure 10. Thus while a plurality of parallel strands are being deposited by the outlets carried by the stationary bar 120, the reciprocable bars 43" and 44" concomitantly deposit layers of transversely arranged continuous strands in the zone 115. As the mat formation moves in a righthand direction by the conveyor 31", a second group or layer of indiscriminately arranged fibers is deposited at the zone 113 upon the first group of fibers and the several layers of continuous strand material. As the formation moves through the zone 116 the reciprocating bars 143 and 144, being provided with one or more strand outlets, cause two layers of strands to be orientated in a direction transversely of the mat formation. As the assembled structure thereafter passes beneath the forming hood 111, a third layer of indiscriminately arranged fibers is deposited or collected forming the uppermost surface layer of the assemblage. The final assemblage therefore consists of a laminated construction comprising one or more layers of continuous strands or bundles of linear material interposed between adjacent layers of groups of fibers, the assemblage being of the character illustrated in Figures 10 and 11. The forming hoods may be provided with nozzles 150 whereby adhesives or bonding agents may be sprayed or applied to the groups or layers of indiscriminately arranged fibers so that the end product or assemblage is integrated into a compact mat or unit which has exceptional strength characteristics in both longitudinal and transverse directions.

Through the employment of the method of my invention it will be readily apparent that many combinations or patterns of transversely arranged, indiscriminately disposed and parallel strands or reinforcing media may be embedded or enclosed within two or more groups or layers of blown fibers or fibers assembled in an indiscriminate or haphazard manner. The process of my invention is continuous in that the groups of fibers are being constantly formed and collected into individual layers concomitantly with the interspersion of one or more strands, yarns or linear bundles of fibers between adjacent layers of indiscriminately or haphazardly arranged fibers.

In all forms of the apparatus illustrated for carrying out the method of my invention, any suitable means may be utilized for applying or impregnating the layers with adhesive or bonding agent. It is to be understood that while the strand orientating and depositing means illustrated is of a mechanical type, it is to be understood that other types of strand conveying and depositing means may be utilized to advantage if desired in producing the laminated products of the invention.

It is apparent that, within the scope of the invention, modifications and different arrangements may be made other than is herein disclosed, and the present disclosure is illustrative merely, the invention comprehending all variations thereof.

I claim:

1. The method of manufacturing a reinforced porous non-woven glass fibrous web, which method consists of, establishing multiple glass fiber forming stations at each of which staple glass fiber is produced, collecting the staple fiber at each forming station separately within separate forming hoods associated with each station, each hood having an open end for discharge of fiber therefrom, passing a collecting belt across the open end of each hood in sequence to collect thereon in sequence layers of glass fiber discharged from the forming hoods thereby forming a non-woven glass fibrous web, delivering into a forming hood a free continuous length glass thread collected in the flow of the staple fiber in random distribution therein in movement to the open end of the hood for collection on the belt simultaneously with the staple fiber in random distribution in staple fiber layer, and depositing in the web between the layers of fiber composing the same continuous length glass threads extending longitudinally of the web and disposed in spaced parallel relationship.

2. Apparatus for producing laminated fibrous products, in combination, a hood, means for feeding streams of molten glass, means including blasts of gas for attenuating the streams to fibers of varying lengths whereby the fibers are directed into the hood, means disposed adjacent the hood and arranged to separate the fibers into groups, a movable conveyor for continuously collecting said groups of fibers, means for delivering continuous strands of fibers intermediate the groups of attenuated fibers, and means for applying a bonding agent onto the attenuated fibers to form an integrated product of the attenuated fibers and continuous strands.

3. Apparatus for producing a reinforced porous nonwoven glass fibrous web, which apparatus consists of, multiple staple glass fiber forming stations placed in sequence relative to each other, a forming hood extending from each of said stations and receiving staple glass fiber produced thereat, said forming hoods each having a discharge opening at the end thereof opposite to that at which the staple fiber is received, a conveyor belt extending across the discharge openings of said forming hoods and movable relative thereto in sequence, continuous length thread supply means positioned adjacent a forming hood supplying free continuous length thread into the hood near the place of entry of the formed staple fiber for random intermingling therewith, and mechanism positioned between adjacent forming hoods and disposed in operative cooperation with said belt for supplying parallel continuous length threads to structure carried by said belt.

4. Apparatus for producing laminated fibrous products, in combination, a plurality of individual chambers; means for feeding streams of molten glass into each of said chambers, means including blasts of gas for attenuating the glass streams in each of said chambers into fibers, said chambers being configurated for directing the fibers during attenuation into a plurality of spaced groups of fibers, a movable conveyor for continuously collecting said groups of fibers to form juxtaposed layers of fibers, means for applying a plurality of continuous strands of fibers intermediate said layers of fibers, means for causing reciprocating movement of said strand applying means transversely of the layers of fibers for orienting the strands in a predetermined pattern, and means for applying a bonding agent to the layers of fibers to form an integrated product of the fibers and strands.

5. Apparatus of the character disclosed, in combination, means for feeding streams of molten glass, means including a blast of gas for attenuating the glass streams into fibers, means for directing the fibers during attenuation into a plurality of groups of fibers, a movable conveyor for continuously collecting said groups of fibers, means for orienting continuous reinforcing strands intermediate said groups of fibers, said strand orienting means including relatively stationary and movable strand feeding devices, means for reciprocating said relatively movable strand feeding device in a direction transversely of the movement of the conveyor for depositing continuous strands transversely of the groups of fibers, said relatively stationary feeding device being arranged to feed strands for disposition longitudinally of the movement of the groups of attenuated fibers.

References Cited in the file of this patent

UNITED STATES PATENTS

| | | |
|---|---|---|
| 921,674 | Clark | May 18, 1909 |
| 1,338,164 | Angier | Apr. 27, 1920 |
| 2,165,280 | Lannan | July 11, 1939 |
| 2,477,555 | Roberts et al. | July 26, 1949 |
| 2,481,949 | Richardson | Sept. 13, 1949 |
| 2,528,091 | Slayter | Oct. 31, 1950 |
| 2,543,101 | Francis | Feb. 27, 1951 |
| 2,552,124 | Tallman | May 8, 1951 |

FOREIGN PATENTS

| | | |
|---|---|---|
| 17,549 | Great Britain | 1898 |